United States Patent

Bof

[11] Patent Number: 5,835,184
[45] Date of Patent: Nov. 10, 1998

[54] PROCESS FOR PRODUCING A SPECTACLE SIDE PIECE HAVING A RESILIENTLY YIELDING MECHANISM

[75] Inventor: Livio Bof, Segusino, Italy

[73] Assignee: Libo Optical S.r.L., Segusino, Italy

[21] Appl. No.: 416,775

[22] PCT Filed: Sep. 29, 1993

[86] PCT No.: PCT/IT93/00101

§ 371 Date: Jun. 15, 1995

§ 102(e) Date: Jun. 15, 1995

[87] PCT Pub. No.: WO94/08265

PCT Pub. Date: Apr. 14, 1994

[30] Foreign Application Priority Data

Oct. 6, 1992 [IT] Italy ................ VR92A0084

[51] Int. Cl.⁶ ................ G02C 5/16; G02C 5/14
[52] U.S. Cl. ................ 351/113; 351/111
[58] Field of Search ................ 351/122, 111, 351/113, 115, 158, 41, 153

[56] References Cited

U.S. PATENT DOCUMENTS

| | | |
|---|---|---|
| 2,064,604 | 12/1936 | Hempel . |
| 4,848,891 | 7/1989 | Lee . |
| 5,165,060 | 11/1992 | Huang ................ 351/113 |
| 5,185,620 | 2/1993 | Cooper ................ 351/113 |

FOREIGN PATENT DOCUMENTS

| | | |
|---|---|---|
| 0 188 296 | 7/1986 | European Pat. Off. . |
| 2 655 162 | 5/1991 | France . |
| 2 101 245 | 8/1972 | Germany . |
| 2 504 669 | 8/1976 | Germany . |

*Primary Examiner*—Hung X. Dang
*Attorney, Agent, or Firm*—Evenson, McKeown, Edwards & Lenahan, P.L.L.C.

[57] ABSTRACT

The process for producing a spectacle side piece comprises a first phase wherein a sleeve open at both ends is secured to one of the ends of metal rods. The sleeve cooperates, in operation, with an elastic yielding mechanism. During a second phase, the sleeve is capped with a synthetic material intended to protect the sleeve against environmental agents, a chamber inside the synthetic material being formed in correspondence with one of the holes of the sleeve. Finally, an elastic yielding mechanism is inserted in the sleeve and made integral with the latter.

10 Claims, 1 Drawing Sheet

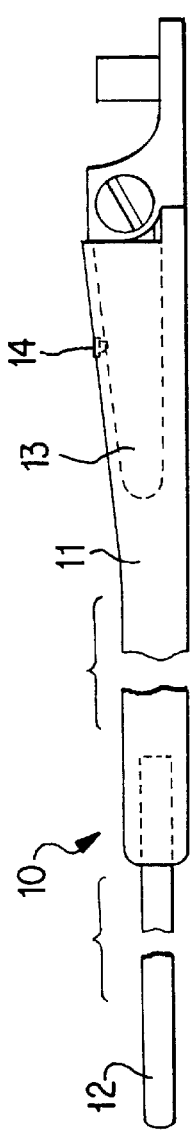
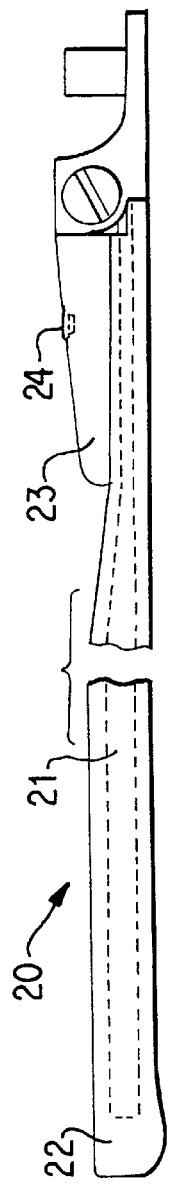
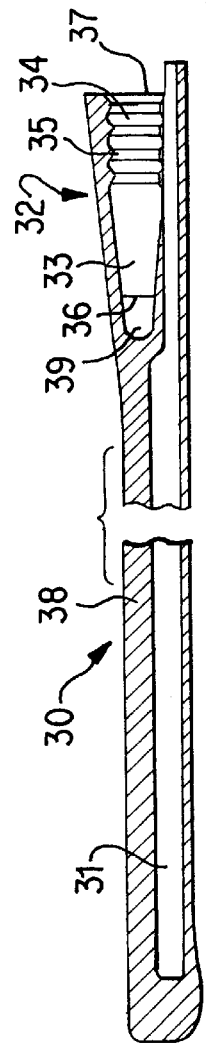
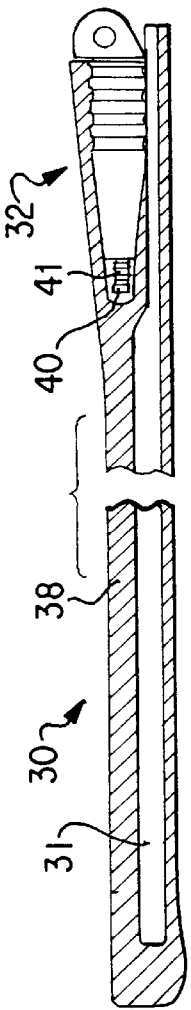

PROCESS FOR PRODUCING A SPECTACLE SIDE PIECE HAVING A RESILIENTLY YIELDING MECHANISM

TECHNICAL FIELD

The invention relates to a process for producing a spectacle side piece.

More particularly, the invention relates to a process for producing a spectacle side piece which is suitable for incorporating a mechanism for flexibly moving the side piece relative to the spectacle's frame.

Moreover, the invention refers to a side piece manufactured by means of such process.

The invention may be mainly applied in the field of eyewear manufacturing.

BACKGROUND ART

Many kinds of side pieces provided with devices allowing a resiliently or flexibly hinged movement are known in the art.

Italian utility model application No. 82530A/89 discloses a side piece of the resilient yielding type for eyewear frames.

Such side piece comprises a rod, in correspondence with one end of which a fiber sleeve is formed by means of an injection process; this sleeve is axially bored in order to house a per se known resilient yielding mechanism.

Generally, such mechanism comprises a cylindrical body, inside of which there is a metallic tie rod, one end of which may be articulated on the spectacle's frame, while the other end is fixed to an element which supports a spring placed between said cylindrical body and said element.

Beside the cylindrical body there is a hole suitable for allowing the resilient yielding device to be fastened to the side piece by means of a screw or a pin or of a suitable restrained joint.

This solution, which is schematically illustrated at FIG. 1, involves many disadvantages and drawbacks which are essentially due to remarkably high assembly times, as well as to a reduced mechanical stability and stiffness, since a major part of the side piece is not provided with a metallic core.

Furthermore, this implies relatively high manufacturing costs.

According to a second form of embodiment known in the art, which is schematically illustrated in FIG. 2, the side piece comprises a continuous metallic core, at one end of which a metallic box is welded, which houses a resilient yielding device including a metallic body, a tie rod and a spring.

The metallic body is generally fastened to the box by means of a screw.

The process of injecting synthetic material about the metallic core is carried out by holding the end of the metallic box and by then injecting the material; in this way the metallic box is left uncovered and at sight.

This solution implies a series of drawbacks and disadvantages too, which are mainly caused by the position of the metallic box which contains the resilient yielding device.

In fact, since the box is placed outside of the injected material, the welding between said box and the metallic core may yield and cause the side piece to be detached from the frame.

Furthermore, a certain wear of the galvanized portion may be noted, due to the contact of the same with the air.

In certain conditions the metallic core may further entirely detach itself from the injected material, and may be extracted from the latter.

Still, the resiliently yielding mechanism is generally fastened to the box by means of a screw, and this causes high costs and assembly time.

Furthermore, since the side pieces are then tumbled, the box containing the resiliently yielding mechanism should be protected from the tumbling rods of the tumbling apparatus; in order to carry out such protection, the metallic box is entirely covered by means of a sleeve made of a plastic material.

This implies a further waste of time and an increase of manufacturing costs.

It should also be noted that the whole resiliently yielding mechanism is in this case welded to the metallic core before the injection of the synthetic material.

Thus, in the case where there were some manufacturing scraps, these have a high cost, since the whole mechanism may not easily be recovered.

DESCRIPTION OF THE INVENTION

The present invention aims to obviate the disadvantages and drawbacks which are typical of the background art, and to provide, thus, for a process for manufacturing a side piece which is suitable for being provided with a resiliently yielding mechanism, said process allowing a side piece to be manufactured at low cost and with a very fast manufacturing time, said side piece having a very good mechanical stability and stiffness, as well as a limited number of component parts.

This is achieved by means of a manufacturing process having the features described in the following.

The process for producing of a spectacle side piece according to the invention comprises a first step during which a metallic sleeve, open at both ends, is welded to one end of a metallic rod.

This sleeve is suitable for cooperating, in operation, with a resiliently yielding mechanism, e.g. a mechanism as described above.

During a second step, in which a synthetic material is injected about the metallic rod, a second rod is inserted into the sleeve is such a way as it protrudes from both ends of the sleeve itself.

Once the synthetic material has been injected, said second rod is withdrawn, thereby leaving free both ends of the sleeve and forming a chamber free of synthetic material in correspondence with the inner end of said sleeve.

The resiliently yielding mechanism is finally inserted into the sleeve and it is fastened to the latter, generally by forcing it into the sleeve and/or by means of suitable adhesives.

A side piece produced by means of such a process involves a plurality of advantages relative to the known solutions.

In fact, the sleeve is entirely buried in the synthetic material, thereby avoiding any problem which could arise from cracking of the welding between the sleeve and the metallic core or from a possible oxidization of the mechanical parts, thereby enhancing the mechanical stability and stiffness of the whole side piece.

Furthermore, it gives rise to the possibility of coloring the parts made of a synthetic material up to the rotation pivot of the side piece, thereby giving the spectacle an improved aesthetical effect.

In the case where the injected synthetic material is transparent, is possible to watch the operating way of the resiliently yielding mechanism, which could constitute an attraction for selling the product.

The side piece manufactured in this way is not provided with any fastening screw, and this helps in reducing both manufacturing time and costs in a considerable way.

Finally, in the case where there were some manufacturing scraps, these scraps never relate to the resiliently yielding mechanism, which is inserted into the sleeve only once the injection is carried out and the material is solidified.

Therefore, remarkable savings concerning the manufacturing scraps may easily be taken into consideration.

ILLUSTRATION OF DRAWINGS

Other advantages and features of the invention will become apparent by reading the following description, given as a non-limiting example, with the help of the figures shown in the attached drawings.

FIGS. 1 and 2 show a schematical side view of a pair of spectacle side pieces known in the art;

FIG. 3 shows a schematical side section of a side piece manufactured by means of a process according to the invention, after the injection;

FIG. 4 shows the side piece of FIG. 3, in which side piece has been inserted a resiliently yielding mechanism.

DESCRIPTION OF A FORM OF EMBODIMENT OF THE INVENTION

FIG. 1 schematically shows a spectacle side piece 10 of a kind known in the art.

Side piece 10 generally comprises a body 11 made of an injected synthetic material and provided with a front hole, inside of which is housed a metallic rod 12, and with a rear hole, inside of which is housed a resiliently yielding mechanism 13 fastened to body 11 by means of a screw 14.

FIG. 2 shows a second side piece 20 of a kind known in the art, comprising a metallic rod 21 buried in a synthetic material 22.

A metallic box 23, inside of which a resiliently yielding mechanism is fixed by means of a screw 24, is welded to rod 21.

The whole box 23 is placed outside of synthetic material 22.

The two described forms of embodiment involve the disadvantages and drawbacks which have previously been discussed.

FIG. 3 shows a side piece 30 manufactured by means of the process according to the present invention.

Side piece 30 generally comprises a metallic rod 31 at one end of which is welded, or anyway fixed, a sleeve 32 having a generally frusto-conical part 33 and a generally cylindrical part 34 provided with a series of external ribs 35.

Furthermore, sleeve 32 is bored (36, 37) in correspondence with its two bases.

According to the invention, the assembly of the rod 31 and the sleeve 32 is covered through injection by a synthetic material, thereby covering the whole sleeve 32.

In this case, ribs 35 allow synthetic material 35 to be firmly sticked to the sleeve, thus to firmly hold it in its position.

While synthetic material 38 is injected, a rod (non-illustrated) is inserted into sleeve 32 in such a way as it protrudes from hole 36 by a predetermined distance.

Once the injection operation is terminated, this rod is withdrawn from sleeve 32, thereby forming a chamber 39 free of synthetic material 38.

Thereafter a per se known resiliently yielding mechanism is inserted into sleeve 32 and fastened to the latter through suitable means, generally by forcing it into the sleeve and/or by means of adhesives and/or through pins, screws or a restrained joint.

FIG. 4 shows this situation, in which the outer end 40 of the tie rod and spring 41 of the mechanism may be observed.

Either the manufacturing process of side piece 30, or the side piece itself allow the previously discussed advantages to be achieved; therefore, they will not be repeated again.

The invention has previously been disclosed with reference to a particularly advantageous form of embodiment thereof.

However, it appears to be clear that the invention comprises several mechanically equivalent forms of embodiment.

Therefore, the invention includes some forms of embodiment according to which the resiliently yielding mechanism is different in respect of the one which has previously been described, as well as some forms of embodiment according to which any kind of synthetic material and any kind of color may be used.

Furthermore, the invention englobes some forms of embodiment according to which the synthetic material covers only a part of the metallic rod forming the core of the side piece, as well as some forms of embodiment according to which this core is subdivided into two different portions, one of which is coupled to the sleeve and the other one protrudes from the injected synthetic material.

According to a further form of embodiment of the invention, the metallic core is heated up and then pushed by applying pressure into a plate made of synthetic material, in order to form the spectacle's side piece.

In this case it is necessary, before inserting the metallic core, to form on the plate a cavity suitable for housing the sleeve.

This cavity may be obtained, for instance, either by means of a drilling machine or by pushing into the plate an overheated metallic rod.

Furthermore, the invention comprises a form of embodiment according to which the metallic core is covered by the synthetic material only in correspondence of the sleeve.

In this case the skirt made of synthetic material used for covering the sleeve is obtained by a separate molding, and it is made integral to the sleeve containing the resiliently yielding mechanism, in such a way as to protect the latter against external agents.

The skirt may be made integral to the sleeve either in a permanent way (e.g. by means of an adhesive), or in a releasable way (e.g. by means of screws or by a restrained joint).

In the latter case the resiliently yielding mechanism may, when necessary, be replaced.

what is claimed is:

1. Process for manufacturing a spectacle side piece, comprising:

fixing a metallic sleeve having holes in axial ends to a metallic rod proximate an end of the metallic rod;

encompassing the metallic sleeve and at least said end of the metallic rod in a synthetic material;

forming a chamber in said synthetic material proximate one of said holes of the sleeve;

inserting a resiliently yielding mechanism into said sleeve; and fastening said resiliently yielding mechanism to said sleeve.

2. Process for manufacturing a spectacle side piece according to claim 1, wherein in said encompassing step said synthetic material forms the shape of a molded skirt covering at least said sleeve.

3. Process for manufacturing a spectacle side piece according to claim 1, wherein said encompassing step is accomplished by heating said metallic rod to a predetermined temperature, and then inserting said heated metallic rod into a plate of said synthetic material at a predetermined pressure, said plate including a cavity for receiving said sleeve.

4. Process for manufacturing a spectacle side piece according to claim 1, wherein said chamber is formed according to the following steps:

prior to said encompassing step, inserting a second rod into said sleeve such that a protruding portion of the second rod protrudes from at least one end of said sleeve; and after said encompassing step, withdrawing said second rod from said metallic sleeve, such that said chamber is formed inside of the synthetic material where said protruding portion of the second rod was located.

5. Process for manufacturing a spectacle side piece according to claim 4, wherein said metallic rod comprises two distinct portions, one end of each portion protruding from the synthetic material.

6. Spectacle side piece manufactured by means of a process according to claims 5, 1, 2, 3, or 4, wherein said sleeve comprises two respective portions having a predetermined shape.

7. Side piece according to claim 6, wherein one of said respective portions has an essentially cylindrical shape, and the other of said respective portions has an essentially frusto-conical shape and carries the resiliently yielding mechanism.

8. Side piece according to claim 7, wherein said one portion having an essentially cylindrical shape is provided with a series of ribs in order to improve the adhesion of the synthetic material to the sleeve.

9. Spectacle side piece according to claim 7, wherein the resiliently yielding mechanism is fastened to the sleeve by at least one of welding, applying a pressure, application of a suitable adhesive, and a fastener.

10. Spectacle side piece according to claim 9, wherein said fastener is a pin, screw, or restraining joint.

* * * * *